March 21, 1967              P. D. LAW              3,310,391
METHOD OF AND APPARATUS FOR PRODUCTION OF GLASS BEADS BY
USE OF A ROTATING WHEEL
Filed Aug. 31, 1962              2 Sheets-Sheet 1
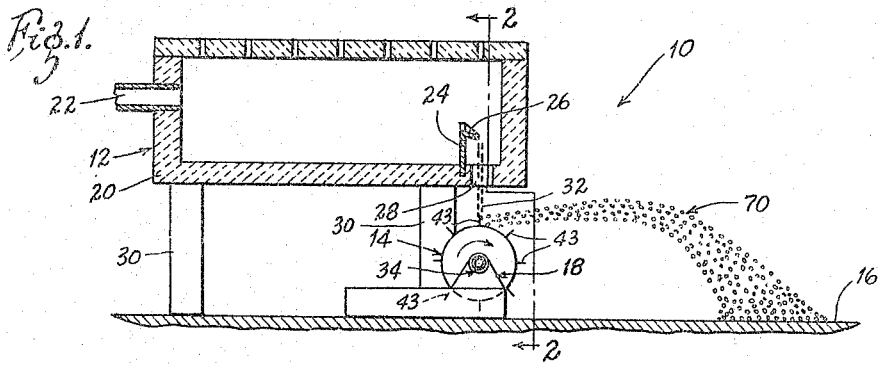
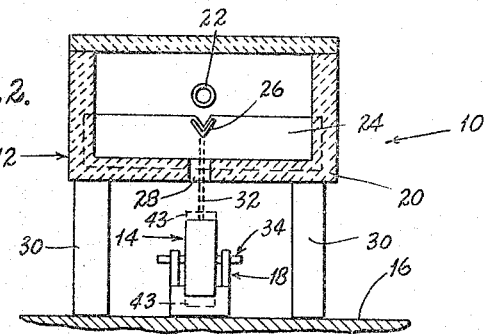
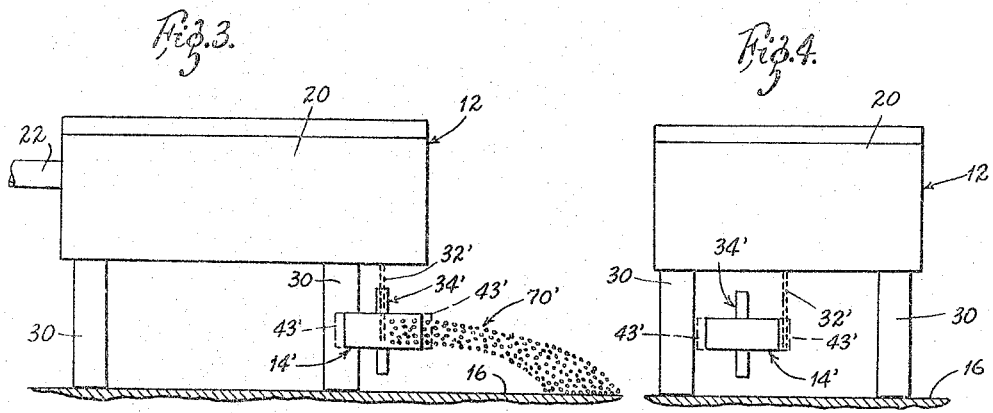
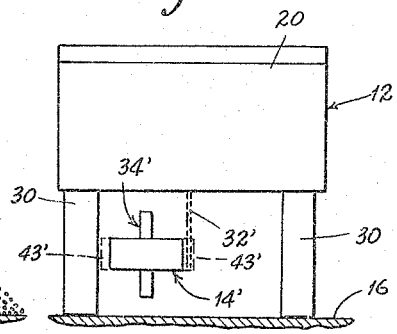
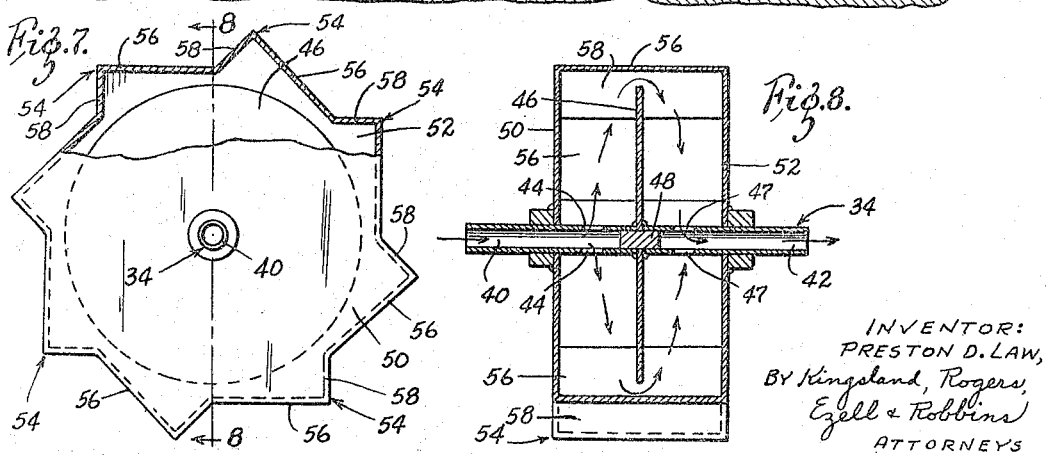
INVENTOR:
PRESTON D. LAW,
BY Kingsland, Rogers,
Ezell & Robbins
ATTORNEYS

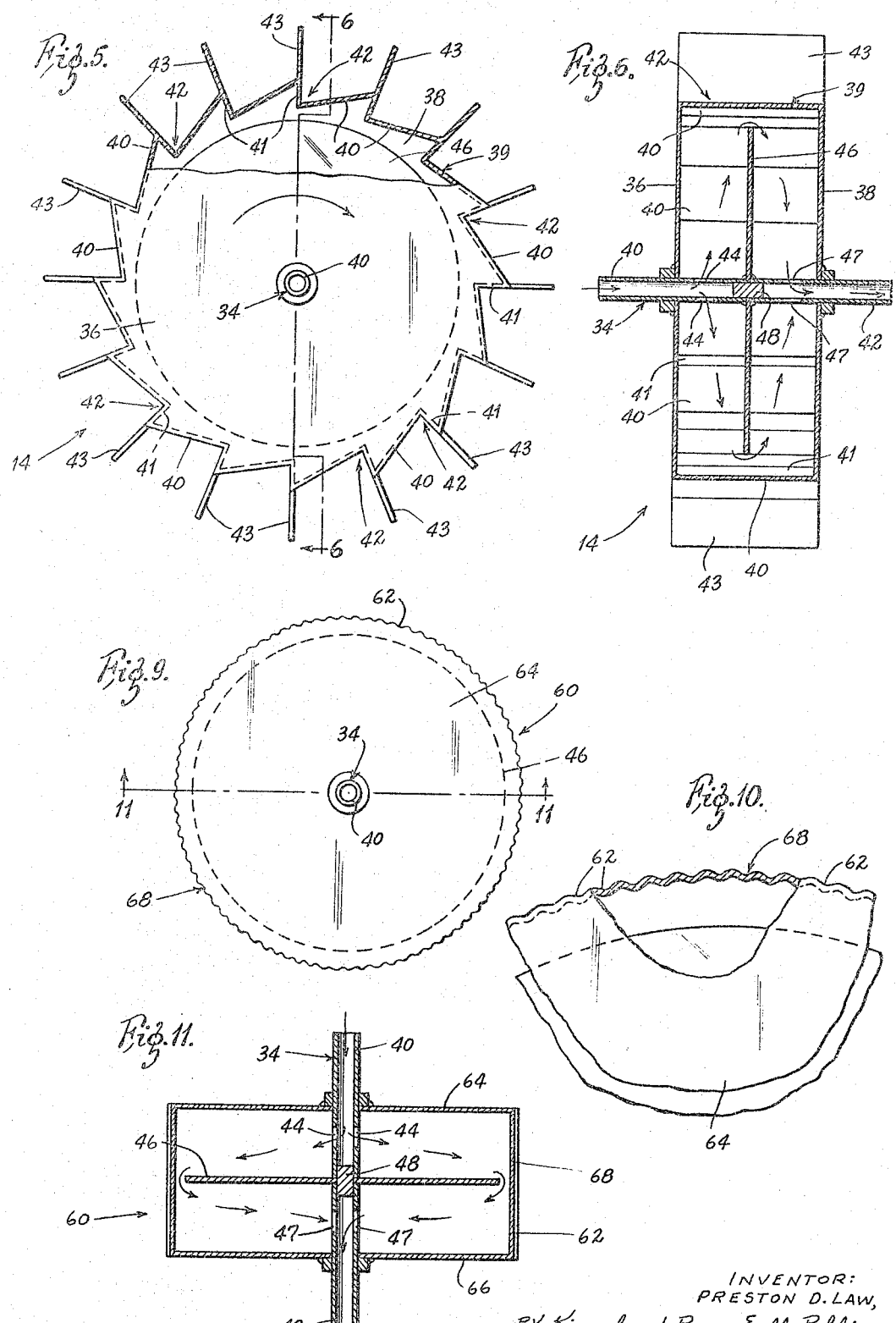

3,310,391
METHOD OF AND APPARATUS FOR PRODUCTION OF GLASS BEADS BY USE OF A ROTATING WHEEL
Preston D. Law, St. Louis, Mo., assignor to Flex-O-Lite Manufacturing Corporation, St. Louis, Mo., a corporation of Missouri
Filed Aug. 31, 1962, Ser. No. 220,817
10 Claims. (Cl. 65—21)

This invention relates to improvements in the production of small glass beads and in particular, is concerned with an apparatus and method for producing such glass beads by dispersing a molten glass stream of glass of low viscosity by means of a paddle wheel.

The glass beads of this invention find particular utility as reflective beads used in highway marking paints, roadside signs, provided with coatings of paint, enamels, lacquers, asphalts or thin plastic sheetings upon which the beads are embedded and which are adapted to be illuminated at night and for the reflective illumination of other surfaces through reflection from a beam of light directed upon the surface. Such glass beads are of small particle size and for optimum reflective brilliance should be of truly spherical configuration. Additionally, the glass beads of this invention can be used where other substantially spherical beads, having a particle size ranging from about 5 mesh down to 400 mesh U.S. standard sieves, are desired. Such application is of very broad scope and the beads find usage in a large number of fields.

In the past, such glass beads of this small particle size have been conventionally produced in glass furnaces in which ground glass stock is introduced into a furnace in the form of a vertical stack or the like and upwardly directed gas is burned at a high temperature to carry the beads which are formed in a spherical configuration to the top of the furnace. This type of apparatus is well shown in the Charles C. Bland Patent No. 2,600,963, issued June 17, 1952, and assigned to applicant's assignee. Such apparatus is very effective in producing glass beads of the desired configuration, but is rather expensive and demands cumbersome and quite tall equipment. Additionally, the size of the glass beads is limited.

By means of the instant invention, there has been provided relatively simple and very effective apparatus in which the glass beads produced can be in a larger particle size than those heretofore produced and in which this particle size may range from relatively large glass beads of about 5 mesh size down to about 400 mesh. The apparatus is adapted to be used in a small space area with little headroom required and can be very simply operated by relatively unskilled workmen.

Essentially, this invention comprises melting a glass charge to a molten liquid in a glass furnace and then dispensing the molten liquid while still in a low viscosity. The low viscosity stream is permitted to flow over a spout and to fall in a stream in space by gravity. The falling stream is then contacted by paddle elements of a paddle wheel rotating at a high rotational speed. The paddle elements cause the glass stream to be dispersed in the form of droplets into the air where surface tension then acts upon the droplets to form them into spherical glass beads and set them in this form. The glass beads are then collected upon a surface such as the floor, or the like, and used in the produced form and classified according to their size.

An essential feature of this invention resides in the employment of a paddle wheel having dispersing elements on the periphery of the wheel. The paddle wheel is so located that the glass stream falls upon the periphery into contact with the dispersing elements so that the glass stream is projected tangentially in a controlled path. The positioning of the paddle wheel may be either upon a horizontal axis in which the free falling stream falls directly upon the top periphery of the paddle wheel, or it may be situated on a vertical axis to one side of the free falling glass stream and so positioned that the stream falls between the dispersing elements so that the rotation of the wheel causes the dispersing elements to contact the glass stream and disperse it. The paddle wheel may take several forms, but, cooling is a special feature of the construction, so that all major surfaces coming into contact with the free falling glass stream are cooled, which minimizes agglomeration and build-up of glass upon the paddle wheel surfaces.

The apparatus is extremely simple to employ and operate and is rugged and durable in its employment. Further, a high degree of control can be effected by the various constructions of the paddle wheel employed and by the manner of positioning. The above features and objects of this invention and further objects will appear in the detailed description which follows and will be otherwise apparent to those skilled in the art.

There are shown for purposes of illustration a preferred embodiment and modifications of this invention in the accompanying drawings. It is to be understood that these drawings and descriptions are for the purpose of example only and that the invention is not limited thereto.

In the drawings:

FIGURE 1 is a view in side elevation of a preferred embodiment of this invention taken partially in vertical section through a glass tank;

FIGURE 2 is a view in section taken on line 2—2 of FIGURE 1;

FIGURE 3 is a view in side elevation of a modified form of the invention;

FIGURE 4 is a front view of the modified form of invention shown in FIGURE 3;

FIGURE 5 is a side view partially in section of a preferred embodiment of a dispersing paddle wheel rotating on a horizontal axis;

FIGURE 6 is a view in section taken on line 6—6 of FIGURE 5;

FIGURE 7 is a side view partially in section showing a modified form of a paddle wheel used on a horizontal axis;

FIGURE 8 is a view in section taken on line 8—8 of FIGURE 7;

FIGURE 9 is a side view of a further modified form of the paddle wheel shown with a horizontal axis;

FIGURE 10 is an enlarged fragmentary side view partially in section showing the construction of the periphery of the wheel of FIGURE 9; and FIGURE 11 is a view in section taken on line 11—11 of FIGURE 9.

A preferred form of this invention is indicated by the reference numeral 10 in FIGURES 1 and 2. The main components of the apparatus comprise a glass furnace 12, a horizontal axis paddle wheel 14 and a collecting floor surface 16. It will be understood that a motor, not shown, is connected to the shaft of the paddle wheel which is supported upon a trunnion 18.

The glass furnace 12 is comprised of a ceramic glass tank 20 having an inlet 22 through which glass stock may be charged. Conventional heating means are employed to melt the glass stock and keep the glass in a low viscosity molten state and such heating means will be readily understood, although not shown in the drawing. At the forward end of the glass tank, there is situated a weir plate 24 which defines the level of the molten glass stock in the tank. This weir plate, made of a suitable metal, has a spout 26 which is directed downwardly to dispense the molten glass stock in a free falling stream through an opening 28 in the furnace. It will be noted that the weir plate provides a substantial space between it and the front of the glass tank through which the molten glass may fall to provide a heat barrier type of enclosure to insure that the liquid does not cool substantially.

The glass furnace 12 is supported a substantial distance off the ground by legs 30 to provide a fair degree of fall of the stream of liquid.

The paddle wheel 14 is disposed underneath the opening 28 so as to receive the glass stream 32 upon its periphery, as best shown in FIGURES 1 and 2. The paddle wheel has a shaft 34 which is mounted upon the trunnion 18. It will be understood that the shaft may be connected directly to a motor or by a pulley belt to provide the source of power to rotate it.

An alternative arrangement of the apparatus is shown in FIGURES 3 and 4. As there shown, the paddle wheel 14 is mounted upon a vertical axis. The trunnion, although not shown, will be readily understood as being mounted to provide for such rotation and a pulley belt can be connected to a motor (not shown) in much the same fashion as in FIGURES 1 and 2 to provide the power to the shaft 34'. In FIGURES 3 and 4, identical reference numerals are employed with the prime designation being utilized to show the modification of these figures.

The construction of the paddle wheel that is preferred is best shown in FIGURES 5 and 6. As there shown, the wheel comprises a base wheel having two side plates 36 and 38 connected to the shaft 34. The plates are connected together by a circumferential end plate 39 on which legs 40 and 41 form a plurality of pockets 42. Paddle extension elements 43 are formed as an extension of legs 41 and extend radially from the center of the wheel around the periphery thereof. Cooling of the paddle wheel is provided by using the hollow shaft 34 as a conduit for cooling water with the end 40 serving as an inlet and the end 42 serving as an outlet. Openings 44 are provided on the inlet end to introduce water around a plate-like baffle 46, and the water returns to the outlet end through openings 47. The baffling provides for intimate contact of the cooling water with all sides of the paddle wheel and the peripheral end plate 39 to which the paddle elements 42 are connected.

By the use of a plug 48 in the center of the paddle shaft between the openings 44 and 47, the paddle wheel has been effectively divided into an efficient cooling section. Thus, the water is caused to take the direction of flow shown by the arrows in FIGURE 6 to provide full cooling to all the exterior surfaces of the paddle wheel without channeling or formation of eddies within the wheel.

A modified form of paddle wheel construction is shown in FIGURES 7 and 8, and in this form the construction is similar to that shown for the preferred embodiments in FIGURES 5 and 6, but, the shape of the sides of the wheel, indicated by reference numerals 50 and 52, differs from that of the former embodiment. Thus, the latter side plates have serrated edges which are in the form of triangular shaped dispersing elements 54. These elements are formed by a long leg 56 and a shorter leg 58 with the longer leg providing a greater surface of dispersing area, which, at the same time, is kept cooled by the cooling construction. The method of cooling is identical to that shown for the embodiments of FIGURES 5 and 6, and similar reference numerals are used. In this embodiment, the exterior paddle elements are eliminated and contact of the molten glass stream with a surface which is not water cooled is avoided. Thus, all the contacting surfaces, that is the surfaces which contact the molten glass stream in the paddle wheel in FIGURES 7 and 8, are directly water cooled.

A further embodiment is shown in FIGURES 9 through 11. In this embodiment, the construction is similar for the paddle wheel as that previously described, but, here again, the side plates and the end plates are of a modified construction. This embodiment, generally indicated by the reference numeral 60, has side plates which are generally circular, but are provided with serrated dispersing elements 62 on the periphery which are of an undulating configuration. The serrations are, in effect, formed by a series of arcs of more or less sinusoidal structure. The paddle wheel is formed by means of side plates 64 and 66 between which an end plate 68 is connected.

*Operation*

In production of glass beads according to the apparatus of FIGURES 1 and 2 of this invention, glass stock is charged through inlet 22 to the glass furnace 12. The furnace is heated to a high temperature which may vary in accordance with the composition of the glass stock, but which should be sufficiently high to change the material to a liquid of low viscosity such that the glass is of a high degree of fluidity. The charging may be carried out continuously in metered fashion to cause the liquid glass to overflow the weir plate 24 and the weir spout 26.

When the glass stock is heated to the high temperature required for conversion of the glass to a liquid of low viscosity and high fluidity, the overflowing liquid will drop in a free falling stream 32 upon the periphery of the paddle wheel 14.

The rapid rotation of the paddle wheel 14 causes the glass stream to be broken up into dispersed droplets. These droplets are propelled in the direction of the path 70 as indicated in FIGURE 1 some distance away from the paddle wheel so that a substantial period of dwell in space is provided for cooling of the beads. This insures that the surface tension of the glass droplets will cause them to form to spherical beads which then fall upon the collecting surface 16 where they are ultimately collected.

It will be understood that the propulsion of the beads is generally tangential from the point of their contact upon the paddle wheel. Thus, should the paddle wheel be moved somewhat to the right of the position shown in FIGURE 1, the beads would be directed upwardly. Thus, if a higher degree of residence in space is desired, this action can be effected. Also, if a shorter residence in space is desired, the paddle wheel can be moved to the right where the glass stream falls upon the right hand section of the paddle wheel and then the path would be directed somewhat downwardly as will be readily apparent.

Further degrees of control in the glass beads manufactured can be effected somewhat by changing the viscosity of the stream, as generally higher viscosities of the free falling stream will produce larger beads. Another measure of control can be effected by the speed of rotation of the paddle wheel as faster speeds of rotation will produce finer droplets and slower rotations will produce somewhat larger droplets and the ultimate glass beads.

In the format of the paddle wheel 14, shown in FIGURES 5 and 6, the construction of the pocket 42 formed on the circumference of the wheel, serves to catch the molten glass stream and propel it outwardly along the leading surface of the paddle elements 43. This provides for a high degree of dispersion and efficiency in the formation of the droplets from free falling molten glass stream. Also, cooling of the paddle elements is somewhat enhanced as they are a continuation of the element 41. Further, any glass falling into the pockets 42 is propelled outwardly along the leading surface of the paddle elements 43. This tends to prevent build up or agglomeration of glass upon the paddle element, which is to be avoided.

The cooling provided by the structure shown in FIGURES 5 and 6 is quite efficient as all of the exterior surfaces of the paddle wheel are in direct contact with cooling water. This cooling minimizes formation of glass accretions upon the wheel which is undesirable in the glass bead production for obvious reasons.

In the embodiment in FIGURES 3 and 4, the paddle wheel is shown mounted upon a vertical axis as contrasted with the horizontal axis of FIGURES 1 and 2. In this embodiment, the molten glass stream is dropped upon the periphery of the paddle wheel so as to be positioned between the rotating paddle element 43. This embodiment may also be employed and it will be apparent that by moving the shaft 34 around the axis of the falling molten glass stream changes in direction of the path may be effected.

The paddle wheel of FIGURES 7 and 8 is used in identical fashion as that shown in the paddle wheel in FIGURES 5 and 6. This wheel does not provide as vigorous a dispersion and may be used for the formation of larger beads. Agglomeration of the paddle wheel, that is to say a build up of glass upon the paddle wheel (FIGURES 7 and 8), is avoided to a greater degree in this embodiment, because all the surfaces coming in contact with the glass stream are water cooled.

The embodiment of FIGURES 9 and 10 is likewise used in a similar fashion as previously described. This provides for a rather high degree of dispersion, yet, at the same time, providing for complete water cooling of all surfaces contacting the molten glass stream. A greater number of serrations, or dispersing elements, are provided by the construction of this particular embodiment as there are more of them based on the periphery of the paddle wheel.

Various changes and modifications may be made in this invention as will be apparent to those skilled in the art. Such changes and modifications are within the scope of teaching of this invention as defined by the appended claims.

What is claimed is:

1. A process for manufacturing glass beads which comprises dispensing a free falling molten glass stream of relatively low viscosity upon the periphery of a rapidly rotating wheel, said wheel having radially projecting dispersing elements on its outer periphery, cooling the entire periphery of said wheel to minimize the formation of glass where it contacts said wheel and to further increase the viscosity of the contacting glass, dispersing the increased viscosity molten glass stream into space in a directed path of dispersed droplets by contact with said dispersing elements, permitting said dispersed droplets to be shaped into spherical form by surface tension, cooling said spheres to solidify the same and collecting the spheres.

2. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming spherical glass beads by surface tension, said wheel member having cooling means to minimize formation of glass upon said dispersing elements.

3. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member having a vertical axis and the wheel member being positioned with dispersing elements rotating in contact with the free falling glass stream, said wheel member being provided with the radially projecting dispersing elements on its outer periphery adapted to contact said glass stream and disperse it into said path of droplets to permit the forming of spherical glass beads by surface tension, said wheel member having cooling means to minimize formation of glass upon said dispersing elements.

4. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having a hollow body and means for passing cooling water into and out of said body.

5. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having a hollow body and a hollow shaft connected to said body and extending through its center serving as an inlet and an outlet for cooling water.

6. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having a hollow body and a hollow shaft connected to said body and extending through its center serving as an inlet and an outlet for cooling water, and baffle means to direct the cooling water against the inside surfaces of the wheel member comprising a disc supported upon said shaft inside the hollow body and spaced from the sides and ends of the wheel member.

7. Apparatus for manufacturing glass beads which comprises means for dispensing molten glass of relatively low viscosity in a free falling glass stream, means for dispersing said glass stream in a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having cooling means to minimize formation of glass upon said dispersing elements, said dispersing elements comprising a plurality of paddle elements extending radially from the periphery of the wheel member, said paddle elements each being supported upon the periphery of the wheel member by a pair of leg elements forming pockets between the paddle elements, one of the leg elements in each pair extending radially from the wheel member and forming a continuation of the paddle element and the other leg member extending obliquely against an adjacent paddle element.

8. Apparatus for manufacturing glass beads which comprises means for dispensing molten glass of relatively low viscosity in a free falling glass stream, means for dispersing said glass stream in a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having cooling means to minimize formation of glass upon said dispersing elements, said dispersing elements comprising a plurality of serrations located upon the periphery of the wheel member.

9. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having cooling means to minimize formation of glass upon said dispersing elements, said dispersing elements comprising a plurality of serrations located upon the periphery of the wheel member, said serrations being formed by a pair of converging flat surfaces, the leading one of said surfaces with respect to the direction of rotation of the wheel being relatively longer than the other surface.

10. Apparatus for manufacturing glass beads which comprises means for dispensing molten glass of relatively low viscosity in a free falling glass stream, means for dispersing said glass stream into a free space in a directed path of droplets, said dispersing means comprising a rotating wheel member positioned underneath said free falling glass stream, said wheel member being provided with radially projecting dispersing elements on its outer periphery adapted to contact said glass stream and disperse it into said path of droplets to permit the forming of spherical glass beads by surface tension, said wheel member having cooling means to minimize formation of glass upon said dispersing elements, said dispersing elements comprising a plurality of serrations located upon the periphery of the wheel member, said serrations being formed by an undulating sheet member extending around the periphery of the wheel member.

References Cited by the Examiner
UNITED STATES PATENTS

| | | | |
|---|---|---|---|
| 180,470 | 8/1876 | Elbers | 65—8 |
| 998,358 | 7/1911 | Lessing. | |
| 1,888,943 | 11/1932 | Von Reiche et al. | 18—2.6 X |
| 1,982,549 | 11/1934 | Stephansen et al. | 18—2.6 X |
| 2,228,287 | 1/1941 | Shaw. | |
| 2,306,449 | 12/1942 | Landgraf | 18—2.6 X |
| 2,758,335 | 8/1956 | Overman | 18—2.6 X |

DONALL H. SYLVESTER, *Primary Examiner.*

F. W. MIGA, *Assistant Examiner.*